Oct. 16, 1956 — L. F. PAPESH — 2,766,803
TRUCK TIRE RIM
Filed Nov. 6, 1952 — 3 Sheets-Sheet 1
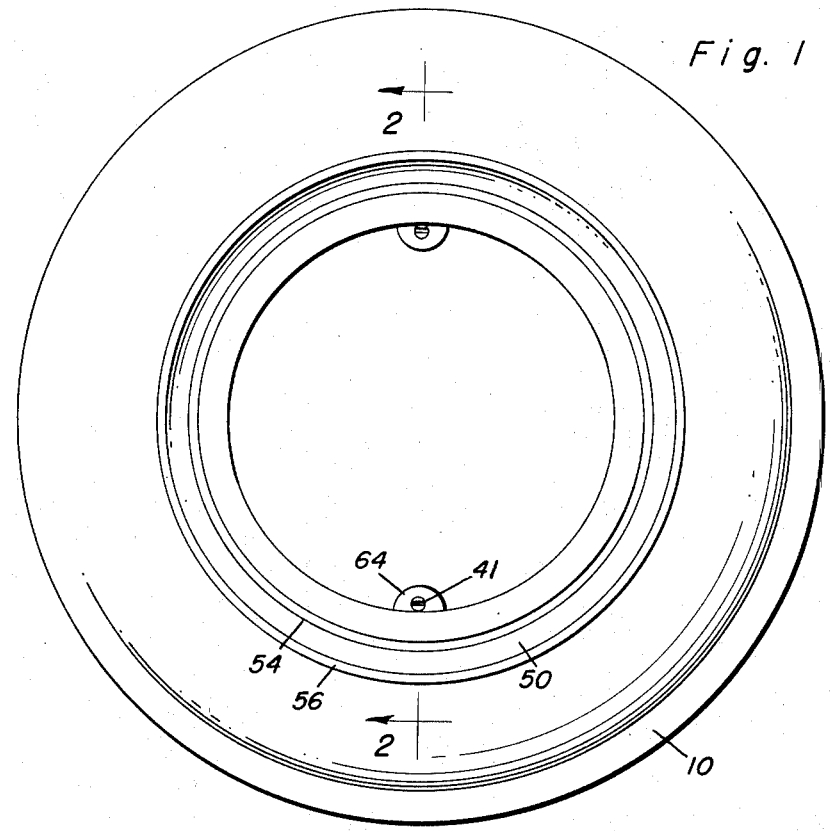
Fig. 1
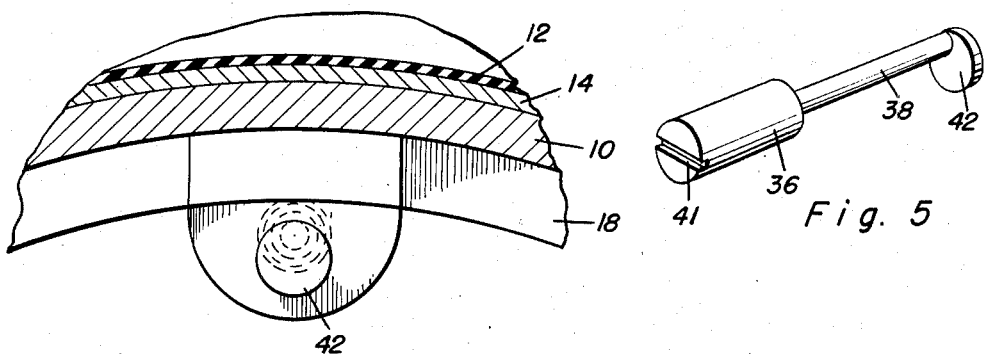
Fig. 4
Fig. 5
Louis F. Papesh
INVENTOR.
BY Clarence A. O'Brien
and Harvey B. Jacobson
Attorneys

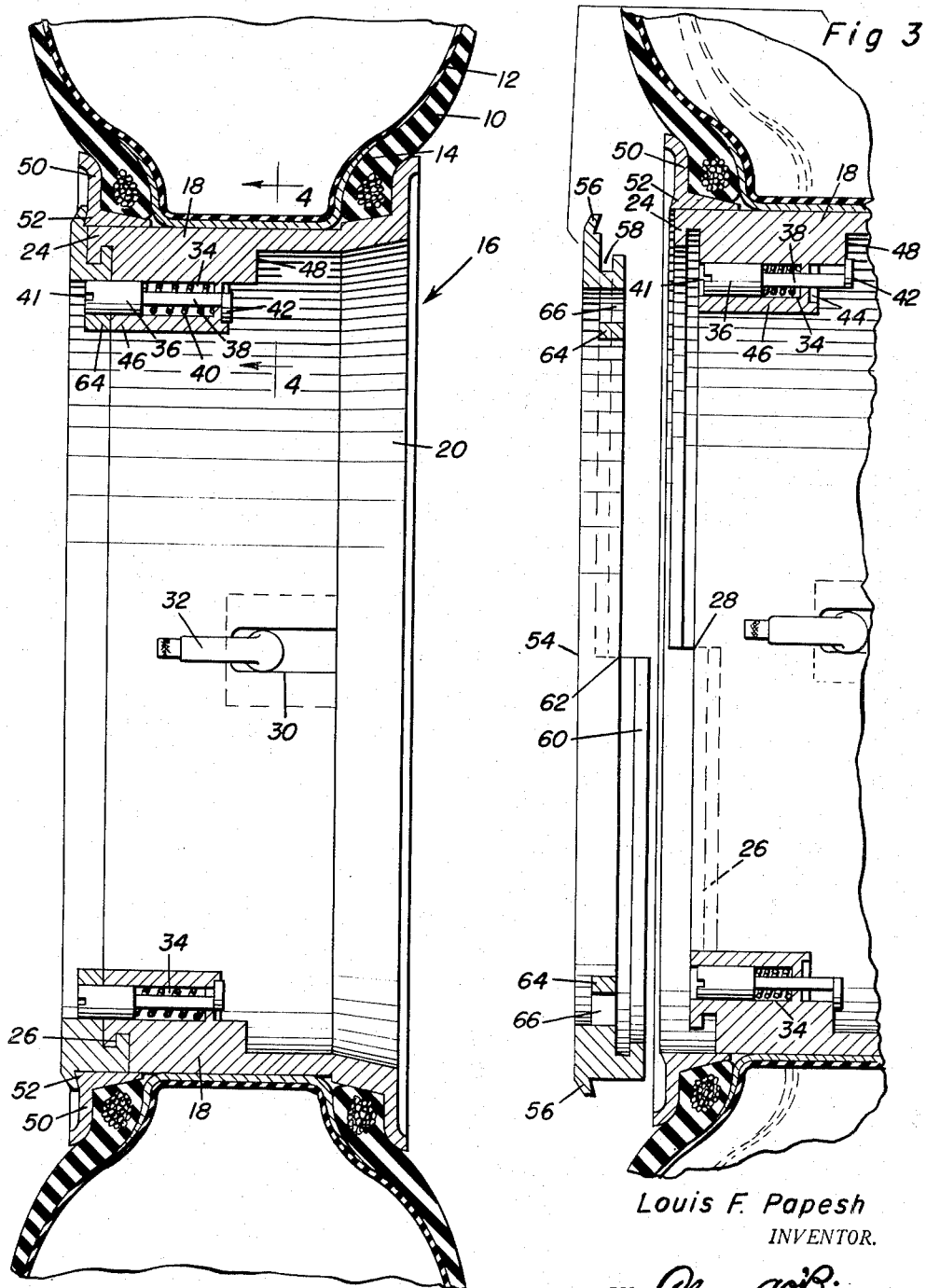

Oct. 16, 1956

L. F. PAPESH 2,766,803

TRUCK TIRE RIM

Filed Nov. 6, 1952

Louis F. Papesh
INVENTOR.

BY *Clarence A. O'Brien
and Harvey B. Jacobson*
Attorneys

United States Patent Office 2,766,803
Patented Oct. 16, 1956

2,766,803

TRUCK TIRE RIM

Louis F. Papesh, Joliet, Ill.

Application November 6, 1952, Serial No. 319,101

8 Claims. (Cl. 152—411)

This invention relates to automotive vehicles, and more particularly to a dismountable rim for truck tires.

Truck tires are of such size, weight and are made of materials of such strength that it is extremely difficult to stretch tires so as to enable them to pass over the annular flanges of the conventional wheel rims as used on trucks. Furthermore, it is desirable to use a protector flap to shield the tube from the rim from the harmful effects of friction, rust, etc. Accordingly, it is the primary object of this invention to provide means for easily installing a pneumatic tire on an automotive vehicle.

Another object is to provide a tire rim that has associated with it a retaining rim for holding a tire on the rim and an interlocking ring which holds the elements of the invention in the desired relationship while preventing the elements from creeping circumferentially on the wheel.

One of the particular features of importance is the interlocking ring which has a semicircular annular groove meeting an L-shaped semicircular tongue. The interlocking ring is also provided with a flange for holding the retaining ring in place and has eye members for receiving locking detents to lock the assembly in position.

Other objects and features reside in the provision of a truck tire rim that is strong, durable, highly efficient in operation, provided with a minimum of exposed joints, and yet which is inexpensive to manufacture.

These, together with the various ancillary objects of the invention which will become apparent as the following description proceeds, are attained by this truck tire rim, a preferred embodiment of which has been illustrated in the accompanying drawings by way of example only, wherein:

Figure 1 is an elevational view, showing a tire installed on the truck tire rim comprising the present invention;

Figure 2 is an enlarged vertical sectional view as taken along the plane of line 2—2 in Figure 1 and showing the device in its assembled position;

Figure 3 is a sectional view similar to that of Figure 2 but showing the elements of the invention in a disassembled position;

Figure 4 is an enlarged sectional view as taken along the plane of line 4—4 in Figure 2;

Figure 5 is a perspective view showing the construction of the detents, an important element of this truck tire rim.

Figure 6:
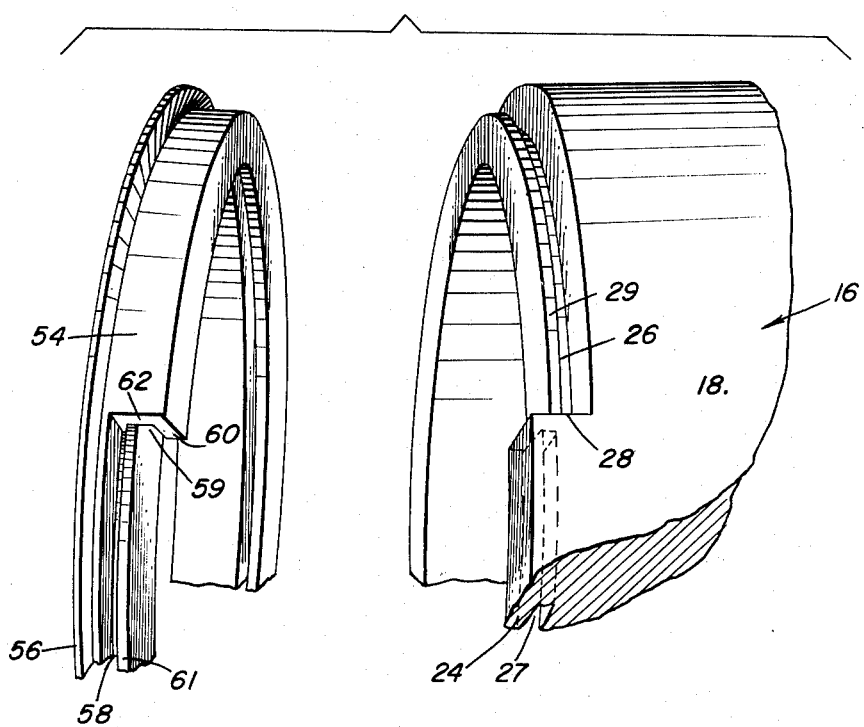
Figure 6 is a partial perspective view of portions of the rim and of the locking ring.

With continuing reference to the accompanying drawings wherein like reference numerals designate similar parts throughout the various views, reference numeral 10 generally designates the casing of a truck tire which is adapted to be installed on the present invention. The inflatable tube 12 of conventional design is provided as is a protector flap 14. This tire is adapted to be installed on the rim generally designated at 16 which is so constructed as to lockingly hold the tire in position in a secure manner.

The rim 16 is provided with a central body portion 18 having an upwardly extending L-shaped flange 20 of similar configuration to the flanges used heretofore on wheel rims of automotive vehicles. The semicircular L-shaped tongue 24 is formed on the other side of the body portion 18 remote from the flange 20 and the tongue 24 terminates adjacent but is not coplanar with a groove as is indicated at 26 which is annular and semicircular in shape to form a shoulder as at 28. The L-shaped tongue 24 is bounded on one side by groove 27, and groove 26 is bounded on one side by flange 29. An elongated slot 30 is formed in the body 18 for passage of the valve stem 32 which passes through the flap 14. This slot is made elongated so as to prevent the valve stem 32 from being cut if the tire becomes deflated.

Slidably inserted within the recesses 34 are detents 36 each having a head portion and a shaft 38 of less diameter. Positioned about the shafts 38 are coil springs 40 which continuously bias the detents 36 out of the recesses 34. As can be seen in Figure 5, the head of the detent 36 is slotted as at 41. On the end of the shaft there is an eccentrically disposed lug 42. This lug 42 is adapted to be selectively engaged within the recess 44 in the projecting portion 46 forming the casing for the recess 34. When the spring 40 is compressed and the detent 36 retracted, the detent can be rotated by the insertion of a screw-driver in slot 41 so as to cause the eccentric 42 to engage the shoulder 48 formed on the body portion 18.

A substantially L-shaped retaining ring 50 having its inner surface of similar shape to the flange 20 is provided. A triangular shaped projection 52 is formed on the retaining ring.

A locking ring 54 is provided and this locking ring has an annularly inwardly extending flange 56 at its outer periphery. The locking ring 54 is further provided with a semi-circular annular groove 58 which terminates adjacent but is not coplanar with a substantially L-shaped tongue 60 of annular semi-circular shape forming a shoulder 62. The L-shaped tongue 60 provides a groove 59 and the groove 58 is bounded by flange 61 on one side. Eyelets 64 depend from the inner periphery of the locking ring 54 and each has an aperture 66 therethrough for reception of the detent 36.

To install a tire on the rim, it is necessary to pass the deflated tire, tube and flap over the body portion 18 and against the flange 20. Then, the retaining ring 50 is pressed over the body portion 18 and inwardly until the tire is approximately at the point shown in the dotted lines in Figure 3 and with the projection 52 inwardly of its ultimate position. The locking ring may be again placed in such position that the groove 58 can receive the L-shaped tongue 24 and the L-shaped tongue 60 on the locking ring 54 can be inserted in the groove 26. Because the tongue 60 projects inwardly from the locking ring 54 the locking ring is so positioned as to permit the tongue 60 to be slidingly inserted in the groove 26 while the tongue 24 seats in the groove 58. This is possible because tongue 60 is not coplanar with tongue 24. With the locking ring in place and the shoulders 62 engaging the shoulders 28, it is then merely necessary to rotate the locking detent 36 using a screw driver in the slot 41 until the eccentric 42 is disengaged from the shoulder 48. Then, the spring 40 will urge the detent through the apertures 66. The flange 56 will engage the triangular projecting portion 52 and hold the retaining ring 50 in position. Using valve stem 32 the tire may then be inflated to the pressure desired urging the projecting portion 52 into engagement with flange 56.

Since in the foregoing the construction and advantages of this truck tire rim are readily apparent further description is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A wheel rim forming a seat for a tire, said rim having at one side a flange forming a retainer for a tire, a retaining ring, an annular interlocking ring, a semi-circular annular groove in one-half of said rim, a semi-circular annular tongue on the other half of said rim, said groove and said tongue forming a shoulder, said interlocking ring being provided with a complementary tongue and a complementary groove forming a shoulder, and means carried by said rim lockingly engaging said interlocking ring engaging said retaining ring to form another retainer for a tire.

2. A wheel rim forming a seat for a tire, said rim having at one side a flange forming a retainer for a tire, a retaining ring, an annular interlocking ring, a semi-circular annular groove in one-half of said rim, a semi-circular annular tongue on the other half of said rim, said groove and said tongue forming a shoulder, said interlocking ring being provided with a complementary tongue and a complementary groove forming a shoulder, and means carried by said rim lockingly engaging said interlocking ring engaging said retaining ring to form another retainer for a tire, recesses in said rim, detents in said recesses, eye members carried by said interlocking ring, said detents being receivable by said eye members to lock said interlocking ring to said rim.

3. A wheel rim forming a seat for a tire, said rim having at one side a flange forming a retainer for a tire, a retaining ring, an annular interlocking ring, a semi-circular annular groove in one-half of said rim, a semi-circular annular tongue on the other half of said rim, said groove and said tongue forming a shoulder, said interlocking ring being provided with a complementary tongue and a complementary groove forming a shoulder, and means carried by said rim lockingly engaging said interlocking ring engaging said retaining ring to form another retainer for a tire, recesses in said rim, detents in said recesses, eye members carried by said interlocking ring, said detents being receivable by said eye members to lock said interlocking ring to said rim, a lug on said detent, spring means in said recesses, a shoulder on said rim, said spring means biasing said detents to engage said eye members, said lugs selectively engaging said shoulder to hold said detents out of said eye member.

4. A wheel rim having an annular flange, a retaining ring, an annular interlocking ring, a semi-circular annular groove on one-half of said rim, a semi-circular annular tongue on the other half of said rim, said interlocking ring having a complementary tongue and a complementary groove, and means carried by said rim lockingly engaging said interlocking ring engaging said retaining ring with the aforesaid tongues received within said grooves, recesses in said rim, detents in said recesses, eye members carried by said interlocking ring, said detents being receivable by said eye members to lock said interlocking ring to said rim.

5. A wheel rim having an annular flange, a retaining ring, an annular interlocking ring, a semi-circular annular groove on one-half of said rim, a semi-circular annular tongue on the other half of said rim, said interlocking ring having a complementary tongue and a complementary groove, and means carried by said rim lockingly engaging said interlocking ring engaging said retaining ring to form another retainer for a tire, said interlocking ring having an angularly extending annular projection, said projection engaging said retaining ring to hold said retaining ring against said interlocking ring and against said rim.

6. A wheel rim forming a seat for a tire, said rim having at one side a flange forming a retainer for a tire, a retaining ring, an annular interlocking ring, a semi-circular annular groove in one-half of said rim, a semi-circular annular tongue on the other half of said rim, said groove and said tongue forming a shoulder, said interlocking ring being provided with a complementary tongue and a complementary groove forming a shoulder, and means carried by said rim lockingly engaging said interlocking ring engaging said retaining ring to form another retainer for a tire, recesses in said rim, detents in said recesses, eye members carried by said interlocking ring, said detents being receivable by said eye members to lock said interlocking ring to said rim, a lug on said detent, spring means in said recesses, a shoulder on said rim, said spring means biasing said detents to engage said eye members, said lugs selectively engaging said shoulder to hold said detents out of said eye member, said interlocking ring having an angularly extending annular projection, said projection engaging said retainer ring to hold said retaining ring against said interlocking ring and against said rim.

7. A wheel rim having an annular flange, a retaining ring, an annular interlocking ring, a semi-circular annular groove on one-half of said rim, a semi-circular annular tongue on the other half of said rim, said interlocking ring having a complementary tongue and a complementary groove, and means carried by said rim lockingly engaging said interlocking ring engaging said retaining ring with the aforesaid tongues received within said grooves, recesses in said rim, detents in said recesses, eye members carried by said interlocking ring, said detents being receivable by said eye members to lock said interlocking ring to said rim, said interlocking ring having an angularly extending annular projection, said projection engaging said retaining ring to hold said retaining ring against said interlocking ring and against said rim.

8. A wheel rim having an annular flange, a retaining ring, an annular interlocking ring, a semi-circular annular groove on one-half of said rim, a semi-circular annular tongue on the other half of said rim, said interlocking ring having a complementary tongue and a complementary groove, and means carried by said rim lockingly engaging said interlocking ring engaging said retaining ring with the aforesaid tongues received within said grooves, recesses in said rim, detents in said recesses, eye members carried by said interlocking ring, said detents being receivable by said eye members to lock said interlocking ring to said rim, a lug on said detent, spring means in said recesses, a shoulder on said rim, said spring means biasing said detents to engage said eye members, said lugs selectively engaging said shoulder to hold said detents out of said eye member, said interlocking ring having an angularly extending annular projection, said projection engaging said retaining ring to hold said retaining ring against said interlocking ring and against said rim.

References Cited in the file of this patent

UNITED STATES PATENTS

| | | |
|---|---|---|
| 865,039 | Hilton | Sept. 3, 1907 |
| 1,417,724 | Flood | May 30, 1922 |
| 1,438,895 | Bryon | Dec. 12, 1922 |
| 1,560,756 | Bryan | Nov. 10, 1925 |
| 1,591,819 | Hayward | July 6, 1926 |
| 2,636,535 | Gaquinto | Apr. 28, 1953 |

FOREIGN PATENTS

| | | |
|---|---|---|
| 437,692 | Italy | July 9, 1948 |
| 1,000,369 | France | Feb. 11, 1952 |